United States Patent [19]

Brown et al.

[11] 3,769,591

[45] Oct. 30, 1973

[54] FREQUENCY SELECTIVE PULSE RECEIVER

[75] Inventors: Paul Merrill Brown, East Whittier; Donovan Chester Davis, Pasadena; James Edward Gross, Covina; Richard Gordon Sweet, Palo Alto, all of Calif.

[73] Assignee: S. Gilfillan Corporation, Los Angeles, Calif.

[22] Filed: Nov. 14, 1956

[21] Appl. No.: 622,217

[52] U.S. Cl. .............................. 325/474, 343/17.1 R

[51] Int. Cl. .............................................. H04b 1/10

[58] Field of Search ......................... 250/20.52, 8.30; 343/17.1, 18 R, 17.1 R; 325/473–478

[56] References Cited

UNITED STATES PATENTS

| | | | |
|---|---|---|---|
| 2,059,870 | 11/1936 | Holmes | 325/403 |
| 2,115,813 | 5/1938 | Jarris | 325/403 |
| 2,151,773 | 3/1939 | Koch | 325/476 |
| 2,160,566 | 5/1939 | Schmidt | 325/456 |
| 2,225,524 | 12/1940 | Percival | 325/474 |
| 2,239,901 | 4/1941 | Percival | 325/476 |
| 2,353,180 | 7/1944 | Muller | 325/474 |
| 2,446,244 | 8/1948 | Richmond | 343/17.1 |
| 2,555,557 | 6/1951 | Peterson et al. | 325/304 |
| 2,852,622 | 9/1958 | Fedde et al. | 325/478 X |

FOREIGN PATENTS OR APPLICATIONS

| | | |
|---|---|---|
| 797,805 | 5/1936 | France |

*Primary Examiner*—Richard A. Farley
*Assistant Examiner*—Steven J. Glassman
*Attorney*—Elwood S. Kendrick

EXEMPLARY CLAIM

3. In a radiant energy receiver, the combination comprising: a main channel having a pass bend to receive incoming signals; a first band pass filter network also connected to receive incoming signals and having a pass band at the center of said main channel pass band; a second band pass filter network connected to receive incoming signals and having a pass band adjacent that of said first filter network; subtraction means responsive to the output signals of said filter networks for producing a control signal having a first magnitude when the output signal of said first pass band filter network is greater than that of said second band pass filter network and having a second and different magnitude when said second band pass filter network has an output signal magnitude greater than that of said first band pass filter network; and means responsive to said control signal for automatically passing the output of said main channel when said control signal is of said first magnitude and for suppressing the output of said main channel when said control signal is of said second magnitude.

8 Claims, 18 Drawing Figures

PAUL MERRILL BROWN
DONOVAN CHESTER DAVIS
JAMES EDWARD GROSS
RICHARD GORDON SWEET
INVENTORS

BY [signature]

ATTORNEY

PAUL MERRILL BROWN
DONOVAN CHESTER DAVIS
JAMES EDWARD GROSS
RICHARD GORDON SWEET
INVENTORS

BY [signature]

ATTORNEY

PAUL MERRILL BROWN
DONOVAN CHESTER DAVIS
JAMES EDWARD GROSS
RICHARD GORDON SWEET
INVENTORS

BY [signature]
ATTORNEY

PAUL MERRILL BROWN
DONOVAN CHESTER DAVIS
JAMES EDWARD GROSS
RICHARD GORDON SWEET
INVENTORS

BY [signature]
ATTORNEY

PAUL MERRILL BROWN
DONOVAN CHESTER DAVIS
JAMES EDWARD GROSS
RICHARD GORDON SWEET
INVENTORS

BY [signature]

ATTORNEY

PAUL MERRILL BROWN
DONOVAN CHESTER DAVIS
JAMES EDWARD GROSS
RICHARD GORDON SWEET
INVENTORS

BY Elmer McKendrick
ATTORNEY

PAUL MERRILL BROWN
DONOVAN CHESTER DAVIS
JAMES EDWARD GROSS
RICHARD GORDON SWEET
INVENTORS

BY [signature]

ATTORNEY

PAUL MERRILL BROWN
DONOVAN CHESTER DAVIS
JAMES EDWARD GROSS
RICHARD GORDON SWEET
INVENTORS

BY [signature]
ATTORNEY

PAUL MERRILL BROWN
DONOVAN CHESTER DAVIS
JAMES EDWARD GROSS
RICHARD GORDON SWEET
INVENTORS

BY [signature]
ATTORNEY

PAUL MERRILL BROWN
DONOVAN CHESTER DAVIS
JAMES EDWARD GROSS
RICHARD GORDON SWEET
INVENTORS

BY [signature]

ATTORNEY

PAUL MERRILL BROWN
DONOVAN CHESTER DAVIS
JAMES EDWARD GROSS
RICHARD GORDON SWEET
INVENTORS

BY

ATTORNEY

FREQUENCY SELECTIVE PULSE RECEIVER

This invention relates to pulse receiving systems, and more particularly to means for discriminating against pulses of radio frequency signals having fundemental frequencies outside a predetermined band of interest, but having at least a portion of one side band lying within the band of interest.

The invention will have a large scope of applications; however, it has particular utility when used in countermeasures receivers where nearby enemy radars or friendly fire control or other active radars, i.e. those employing transmitters, may tend to interfere with reception of passive countermeasures receivers or those relying only upon radiation from an enemy transmitter for making a determination of the location of the enemy.

It will be appreciated that the jamming of enemy radars that is accomplished through the use of countermeasures receivers can be an effective countermeasure; however, in most situations, it will also be desirable to fire projectiles or missiles at an approaching enemy in order to develop an adequate defense. This, in turn, ofen requires the use of fire control radars. Thus, if the fundamental transmission frequency of an enemy radar is in one of the side bands of a friendly fire control radar, reception by a countermeasures receiver may be interrupted and the position or location of the enemy radar may be lost for jamming purposes.

A partial solution to the above-described problem simply requires the use of a selective band pass filter in the countermeasures receiver to attenuate side bands of all off-frequency signals, i.e. those having fundamental transmission frequencies outside the pass band of the receiver. However, this device obviously will not discriminate against any of the side bands of an off-frequency signal occurring within the pass band of the receiver.

The present invention overcomes this and other disadvantages of the prior art by providing, in a system for receiving pulse on-frequency signals having fundamental frequencies in a predetermined pass band of interest, a device for suppressing its own output signals in response to the application of a control signal thereto, the arrangement including at least first and second networks, the first network having a first pass band coextensive with the predetermined pass band, the second network having a second pass band including a band of frequencies outside of the predetermined pass band, the width of the second pass band being sufficiently large to pass an output signal greater than that of the first network when an off-frequency signal having a fundamental frequency on the same side of the predetermined band of interest as the second pass band is received by the system, and a bandwidth sufficiently small to pass an output signal less than that of the first network when an on-frequency signal is received, whereby off-frequency signals may be suppressed when the output of the second network exceeds that of the first network, and on-frequency signals may be passed when the output of the first network is greater than that of the second network. By using this arrangement in a pulse receiver, advantage is taken of the power spectrum of radio frequency pulses. That is, the scalloped shaped spectrum which reaches several maxima on two curves which decrease substantially exponentially with frequency from the fundamental frequency of the spectrum. A signal having a fundamental frequency in the receiver pass band will then have more power distributed in the predetermined band of interest or the receiver pass band than in the second pass band mentioned above. If the power received in the second pass band is greater than that received in the receiver pass band, the signal received must then be an off-frequency signal and should therefore be rejected.

The rejection or suppression of off-frequency signals may be accomplished by either of two means, each of which may be normally biased to pass any signal or normally biased to reject any signal. For example, if such a means is normally biased to pass any signal, it will be biased to reject a signal when the output of the second network exceeds that of the first. If the means is normally biased to reject any signal, it will then be biased to pass any signal when the output of the first network exceeds that of the second.

As stated previously, two means may be usefully employed to reject off-frequency signals. The first is simply a gain control amplifier responsive to the amplified difference between the output of each of the networks. The second is an electronic switch which may be operated in substantially the same way.

Accordingly, the phrase "means both for suppressing any output signal of the receiver when the output of the second network exceeds the output of the first, and for passing any output signal of the receiver when the output of the first network exceeds that of the second," when used hereinafter, is meant to include a gain control amplifier, electronic switch, or other equivalent device, which may be normally operated to pass or reject any signal, the condition of which is changed by the comparison of the output signal amplitudes of each of the first and second networks.

As broadly stated above, the invention may be used to reject off-frequency signals having fundamental frequencies only on one side of the receiver pass band. However, according to a preferred practice of the invention, off-frequency signals having fundamental frequencies on either side of the receiver pass band are rejected by the use of either of two auxiliary channels with a main channel in a pulse receiver.

In one case, first, second and third filter networks are provided in the auxiliary channel, the second filter network having a second pass band coextensive with the predetermined pass band, the first filter network having a first pass band below the second pass band, the third filter network having a third pass band above the second pass band, the width of the first pass band being such that an output signal greater than that of the second filter network is passed by the first filter when off-frequency signals having fundamental frequencies below the second pass band are received by the system and an output signal less than that of the second filter network is passed by the first network when on-frequency signals are received by the system, the width of the third pass band similarly such that an output signal greater than that of the second filter network is passed by the third filter network when off-frequency signals having fundamental frequencies above that of the center frequency of the second pass band are received by the system and an output signal less than that of the second filter network is passed by the third filter network when on-frequency signals are received by the system, first means responsive to the output signals of the filter networks for producing a control signal when the output of the second filter network is different from that of the first and third filter networks, a delay device in the main channel for delaying the input signals, and second means responsive to the control signal both for suppressing the output of the delay device when the input signals are off-frequency signals and for passing the output of the delay device when the input signals are on-frequency signals. In this case, the first and third filter networks are used individually with the second filter network to detect off-frequency signals having fundamental frequencies both above and below the predetermined band of interest, respectively.

An alternative embodiment of the invention contemplates the use of an amplifier, filter or other network having a pass band the same as the predetermined pass band of interest, all of the components being connected in the main channel. In this case, the auxiliary channel is provided with a filter or similar network having a pass band with lower and upper frequency limits beyond the lower and upper frequency limits of the predetermined band of interest. Thus, if the detected output signal amplitude of the auxiliary channel is greater than that of the main channel, an off-frequency signal has been received which may be rejected by either of the above-described means. Such means will also be adapted to pass all on-frequency signals which will obviously occur when the output signal amplitude of the main channel exceeds that of the auxiliary channel. However, all off-frequency signals having fundamental frequencies on either side of the predetermined band of interest will be rejected because of the relationships of the upper and lower frequency limits of the auxiliary and main channel pass bands.

Since both of the gain amplifier and electronic switch devices are really "instantaneous automatic gain control means," when that term is defined rather broadly, preferably a delay device is incorporated in the pulse receiver main channel ahead of the automatic gain control amplifier or electronic switch to compensate for any signal delay in the auxiliary channel not imposed by the main channel.

It is therefore an object of the invention to provide means to discriminate against pulsed alternating signals having fundamental frequencies lying outside of a predetermined band of interest.

It is another object of the invention to provide automatic gain control means to reject all off-frequency signal power including that in side bands of a pulsed alternating signal having only side bands in a predetermined band of interest.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

FIGS. 14*a*, 4*b*, 15*a*, 15*b* and 16 are detailed schematic diagrams of several of the components shown in the embodiment of the invention of FIG. 12.

Figure 1:
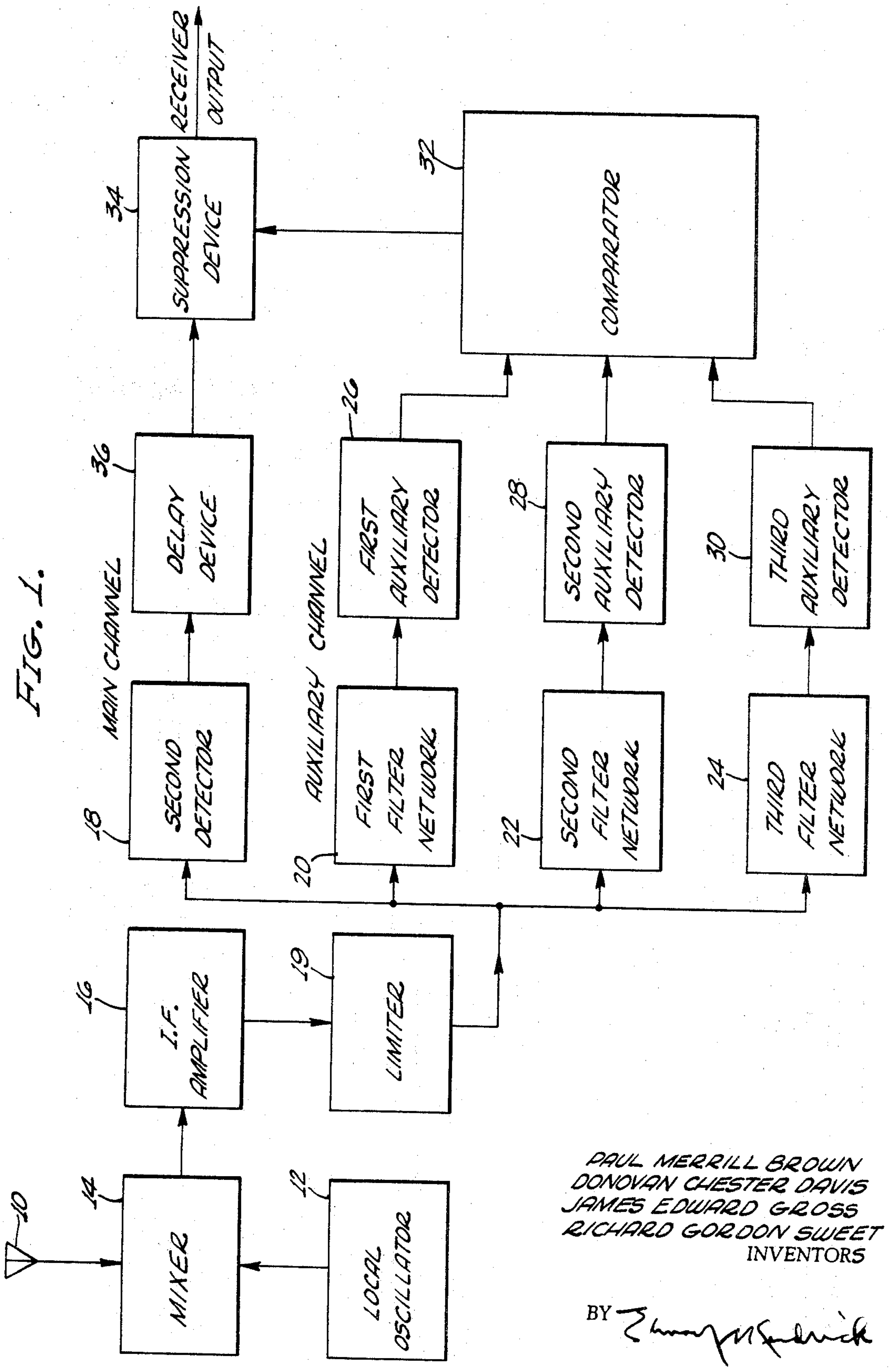
FIG. 1 is a block diagram of one embodiment of the invention.

In the drawing in FIG. 1 an antenna 10 and a local oscillator 12 are shown connected to a mixer 14, the output of which is passed through an intermediate frequency or IF amplifier 16, the output of which is in turn impressed upon a second detector 18, and a limiter 19. The output of limiter 19 is then impressed upon a first filter network 20, a second filter network 22 and a third filter network 24. The second detector 18 is connected in what may be considered the main channel of the pulse receiver and the first, second and third filter networks 20, 22 and 24 may be considered as being connected in an auxiliary channel. The outputs of the first, second and third filter networks 20, 22 and 24 are respectively connected to first, second and third auxiliary detectors 26, 28 and 30, respectively. The output of all the auxiliary detectors 26, 28 and 30 are impressed upon a comparator 32, the output of which is impressed upon a suppression device 34.

The suppression device 34 is employed to pass output signals from the main channel at the output of a delay device 36 which is connected between second detector 18 and suppression device 34.

The local oscillator 12 and mixer 14 are preferably employed to heterodyne down radio frequency signals of relative high frequencies. IF amplifier 16 and second detector 18 are employed in their usual capacities, and delay device 36 is employed to delay the output signals of second detector 18 for the purpose of what may be considered instantaneous automatic gain control or IAGC provided by suppression device 34 which is supplied with a control signal by comparator 32.

The pass band of the second filter network preferably is equal to that of the desired pass band of the pulse receiver shown in FIG. 1. The first filter network 20 preferably has a pass band just below the pass band of the second filter network 22. Similarly the third filter network 24 preferably has a pass band just above the pass band of the second filter network 22. The auxiliary detectors 26, 28 and 30 are employed simply to detect the output of the filter networks 20, 22 and 24. Comparator 32 is employed to impress a biasing signal or a gating signal on suppression device 34 when the outputs of one of the first and third auxiliary detectors 26 and 39 either exceeds or falls below that of the second auxiliary detector 28. The exact manner in which the comparator 32 operates will depend upon how the suppression device 34 is biased. The suppression device 34 may comprise a gain control amplifier or electronic switch. Either of these two devices may be biased normally to reject all signals received at the output of delay device 36 or to pass all of these signals. If the suppression device 34 is biased to normally reject all signals at the output of the delay device 36, then the comparator 32 will be so constructed and arranged that when the output of the second auxiliary detector 28 exceeds those of both the first and third auxiliary detectors 26 and 30, a control signal will be developed by the comparator 32 to reverse the bias on the suppression device 34 and pass the output signals of the delay device 36. As will be explained subsequently, output signals of the delay device 36 must be "on-frequency" signals, i.e. within the pass band of the second filter network 22 if the above conditions exist.

If the suppression device 34 is normally biased to pass all the output signals of the delay device 36, then comparator 32 will develop a control signal to bias the suppression device 34 to reject signals when either of the outputs from the first or third auxiliary detectors 26 and 30 exceed that of the second auxiliary detector 28.

Figure 2:
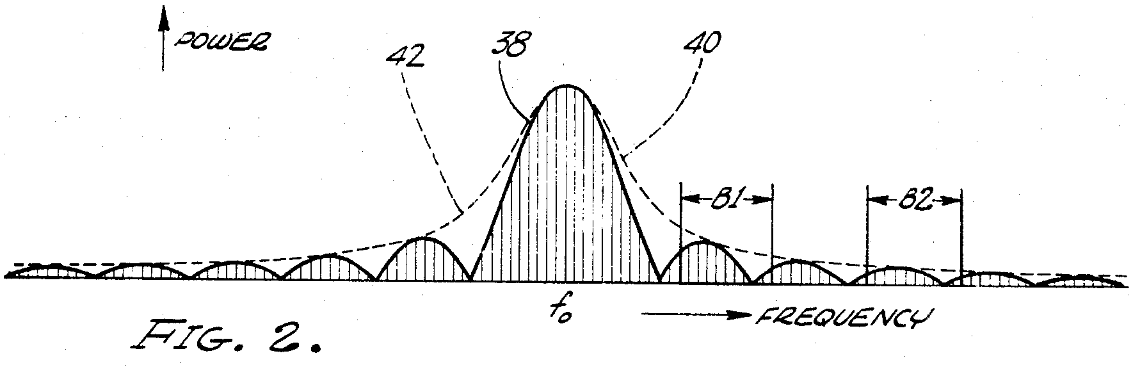
FIGS. 2 and 3 are graphs of signal power spectrums with the band pass characteristics of three filters shown in the block diagram of FIG. 1.
Figure 3:
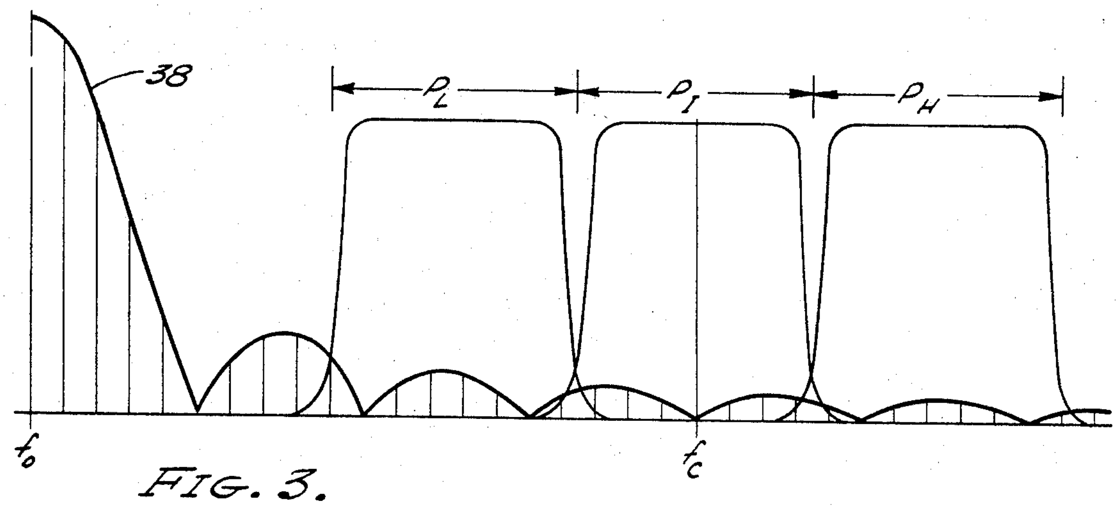

The manner in which the pulse receiver shown in FIG. 1 operates is better illustrated when viewed in light of the characteristics curve shown in FIGS. 2 and 3. In FIG. 2 the frequency spectrum of pulsed alternating signals is illustrated by a curve 38 which is a scalloped-shaped curve extending from point to point from the tops of the harmonics of a fundamental frequency $f_o$ of the alternating signal. Dotted line 40 is a generally exponentially decreasing function of frequency and dotted line 42 is a substantially exponentially increasing function of frequency. The dotted lines 40 and 42 are generally drawn through the maxima of the scalloped-shaped curve 38.

It can be seen that a band of frequencies $B_1$ located nearer the fundamental frequency $f_o$ than a second band $B_2$ will have more power distributed in its band due to signal than the band $B_2$ when the band $B_2$ is of equal width. It is this characteristic of an off-frequency signal that is employed in the device of the present invention.

The characteristic curve on each side of the fundamental frequency $f_o$ may be found on page 22 of Radio Engineers Handbook by F. E. Terman, first edition 1943 (McGraw-Hill). Two side bands, i.e. one on the right of the fundamental frequency $f_o$ and another on the left are provided due to the particular square wave and periodic pulse modulation of microwave energy.

In FIG. 3 the right half of the curve 38 is shown with three characteristics corresponding to the low, high and intermediate pass bands of first, third and second filters 20, 24 and 22, respectively, shown in FIG. 1. The intermediate pass band is indicated at $P_I$. The low and high pass bands are generally at $P_L$ and $P_H$. $f_c$ may be considered the center frequency of the intermediate pass band $P_I$. Thus, first filter network 20 shown in FIG. 1 may have a pass band $P_L$, second filter network 22 a pass band $P_I$, and third filter network 24 a pass band $P_H$.

When an off-frequency signal is received, i.e. one having a power spectrum is indicated at 38 in FIG. 3, one of the low or high bands $P_L$ or $P_H$ must be higher than that in the intermediate band $P_I$. For example, if the fundamental frequency $f_o$ of the off-frequency signal were outside the intermediate band $P_I$ but higher than the center frequency $f_c$ of that band, the power passed by third auxiliary detector 30 would be greater than that passed by either the first or second auxiliary detectors 26 or 28. In the case as shown, more power is passed by the first auxiliary detector 26 because more power is received through the low band $P_L$ than in the intermediate or high bands $P_I$ or $P_H$ respectively. Thus, when an off-frequency signal is received through the antenna 10, is mixed in the oscillator 14 with the output signal of the local oscillator 12 and amplified in amplifier 16, it is impressed on first, second and third filter networks 20, 22 and 24, the outputs of which are detected respectively by first, second and third auxiliary detectors 26, 28 and 30.

If the input signal is an on-frequency signal, the output of second auxiliary detector 28 will exceed the output of both the first and third auxiliary detectors 26 and 30. This is however not to say that the output of the second auxiliary detector 26 will exceed the sum of the outputs of the first and third auxiliary detectors 26 and 30, but only each individually. In this case, comparator 32 will produce a control signal to "open" the suppression device 34 to pass the delayed and detected output signal of IF amplifier, detected by second detector 18 and delayed by delay device 36; or, if the suppression device is normally biased to pass the delayed signals at the output of delay device 36, comparator 32 will produce no biasing signal at all to impress upon the suppression device 34.

When an off-frequency signal having a fundamental frequency $f_o$ below the intermediate pass band $P_I$, the output of first auxiliary detector 28 and comparator 32 will produce a control signal to bias suppression device 34 off to reject any delayed signal at the output of the delay device 36 if the suppression device 36 is not already biased to reject any signal. In this case, comparator 32 will of course not necessarily produce any control signal at all.

Should an off-frequency signal having a fundamental frequency $f_o$ above the intermediate pass band $P_I$ of the second filter network 22, the output of third auxiliary detector 30 will exceed the output of second auxiliary detector 28 and comparator 32 will again produce a control signal to bias the suppression device 34 in a direction to reject any output signal of delay device 36, i.e. if the suppression device 34 is not normally biased to reject any signal. Of course the comparator 32 again need not necessarily produce a biasing signal if the suppression device 34 is always biased to reject any input signal unless a control signal is applied thereto to gain the output of delay device 36 through it.

Figure 4:
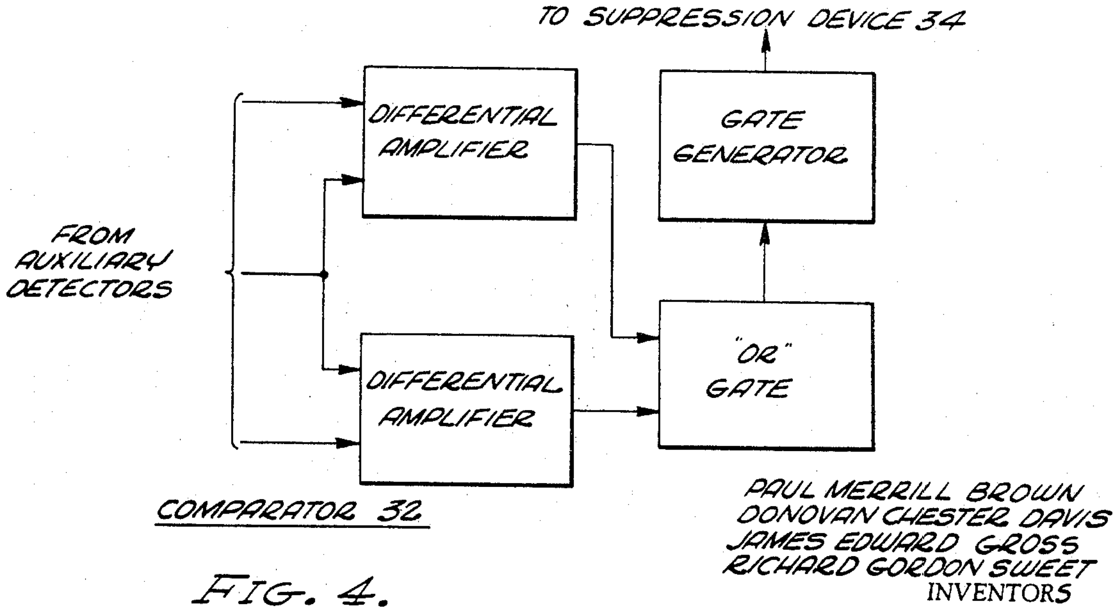
FIG. 4 is a more specific block diagram of a comparator shown in FIG. 1.

Comparator 32 may take various forms. One such form is shown in FIG. 4 where the inputs to the comparator are impressed upon two differential amplifiers 44 and 46, the output of which are impressed upon an "or" gate 48 which is, in turn, impressed upon a gate generator 50. Differential amplifier 44 is employed to produce a gating signal when the output of first auxiliary detector 26 exceeds that of second auxiliary detector 28. Differential amplifier 46 is employed to produce a gating signal when the output of third auxiliary detector 30 exceeds that of second auxiliary detector 28. "Or" gate 48 actuates gate generator 50 when either of these conditions exist. This means that gate generator 50 operates suppression device 34 which should be biased to normally pass all output signals of the delay device 36.

If suppression device 34 is biased normally to reject all output signals of delay device 36, then differential amplifiers 44 and 46 must be so set to provide output signals only when second auxiliary detector 28 produces an output signal greater than those of first and third auxiliary detectors 26 and 30, respectively.

Figure 5:
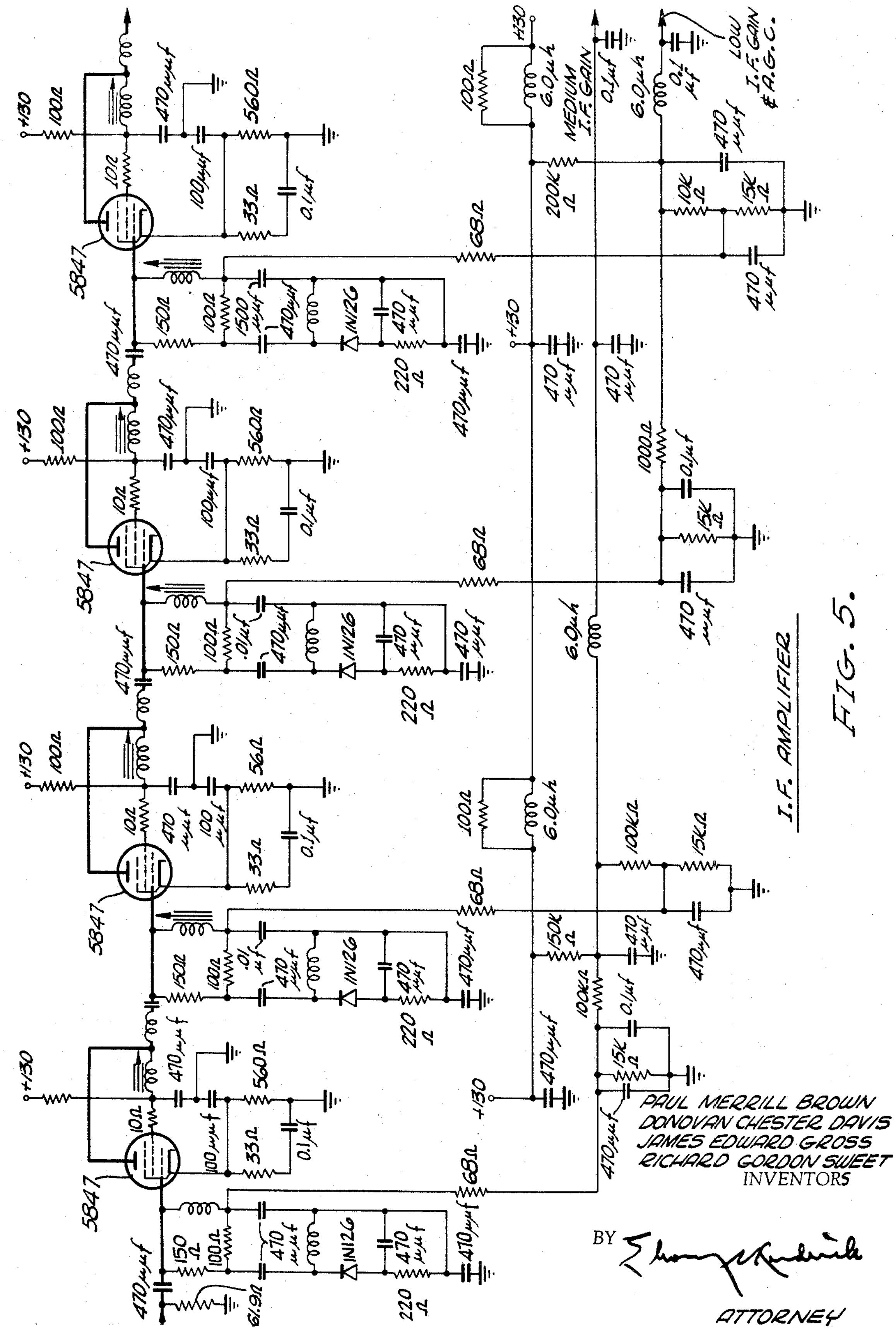
FIGS. 5, 6, 7 and 8 are detailed schematic diagrams of several of the components shown in the diagram of FIG. 1.
Figure 6:
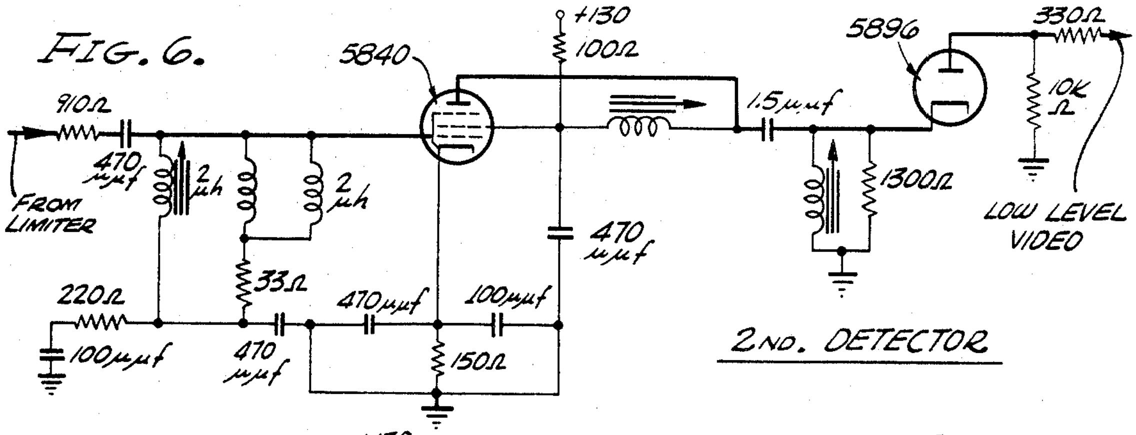
Figure 7:
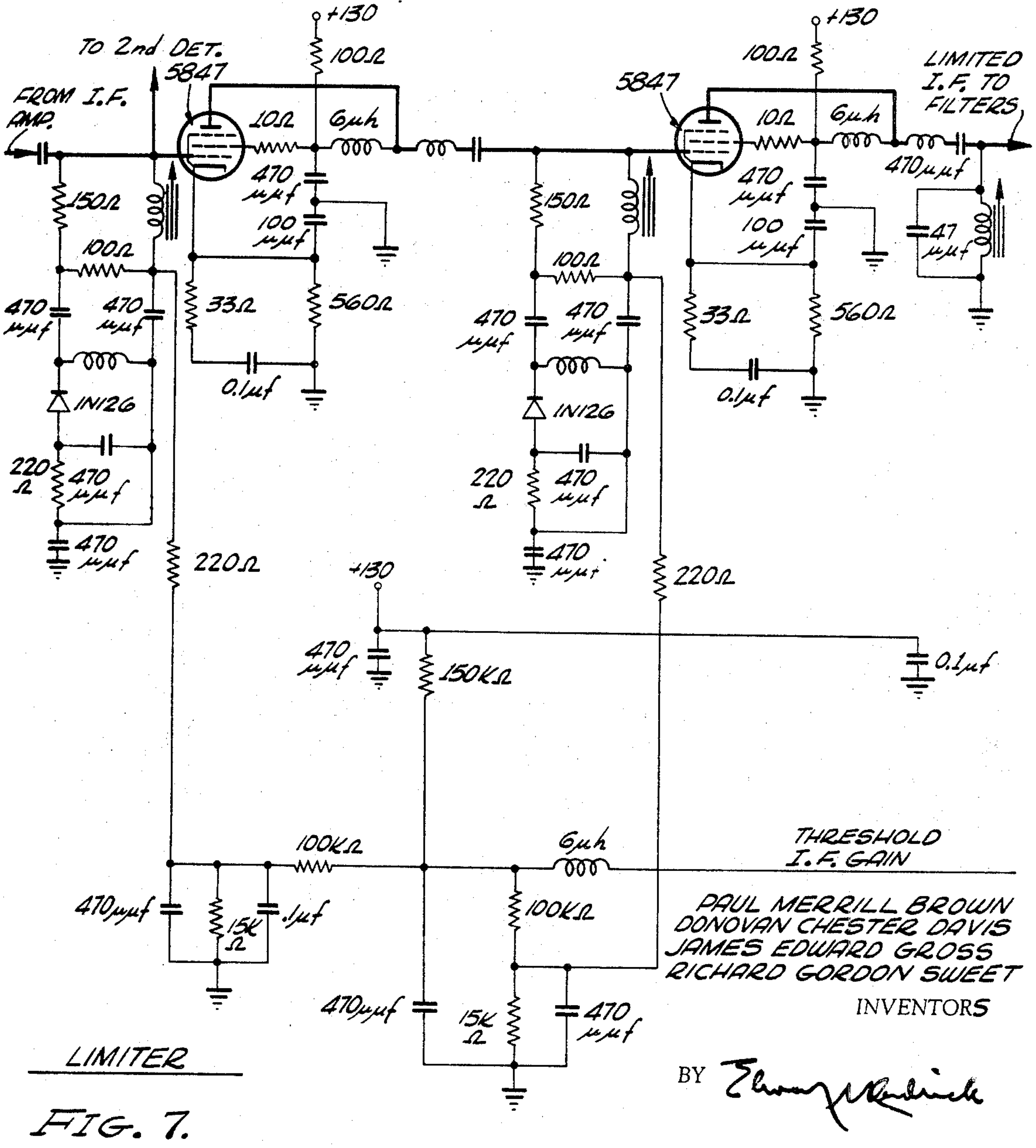

A detailed schematic diagram of IF amplifier 16 is shown in FIG. 5, a detailed schematic diagram of second detector 18 is shown in FIG. 6, and a detailed schematic diagram of limiter 19 is shown in FIG. 7. IF amplifier 16 and second detector 18 as shown in FIGS. 5 and 6, respectively, are substantially conventional in design. Limiter 19 shown in FIG. 7 limits by use of a grid bias on a tube $T_1$ to induce grid clipping.

Figure 8:
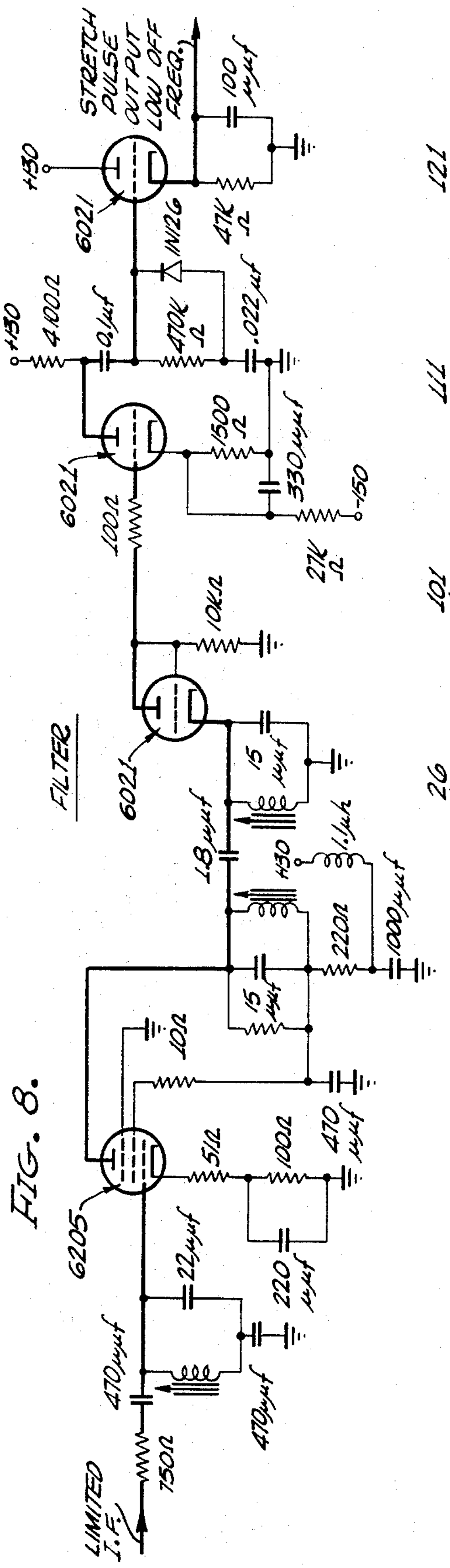

Each of the filter networks 20, 22 and 24 may be identical in construction and have a construction as shown in a detailed schematic diagram in FIG. 8. Only the value of resistor $R_1$ need be changed to provide filter networks of different pass bands.

In one specific embodiment of the invention reduced to practice, the network shown in FIG. 8 was employed four times to produce four filter networks of pass bands equal to 10 megocycles. In this case, $R_1$ in the first and third filter networks 20 and 24 were equal to 12 and 2200 ohms. Two filter networks were substituted for second filter network 22 of the identical type with 10 megocycle bandwidths each. In this case, $R_1$ in each of these filter networks were equal to 15 and 1800 ohms respectively.

Figure 9:
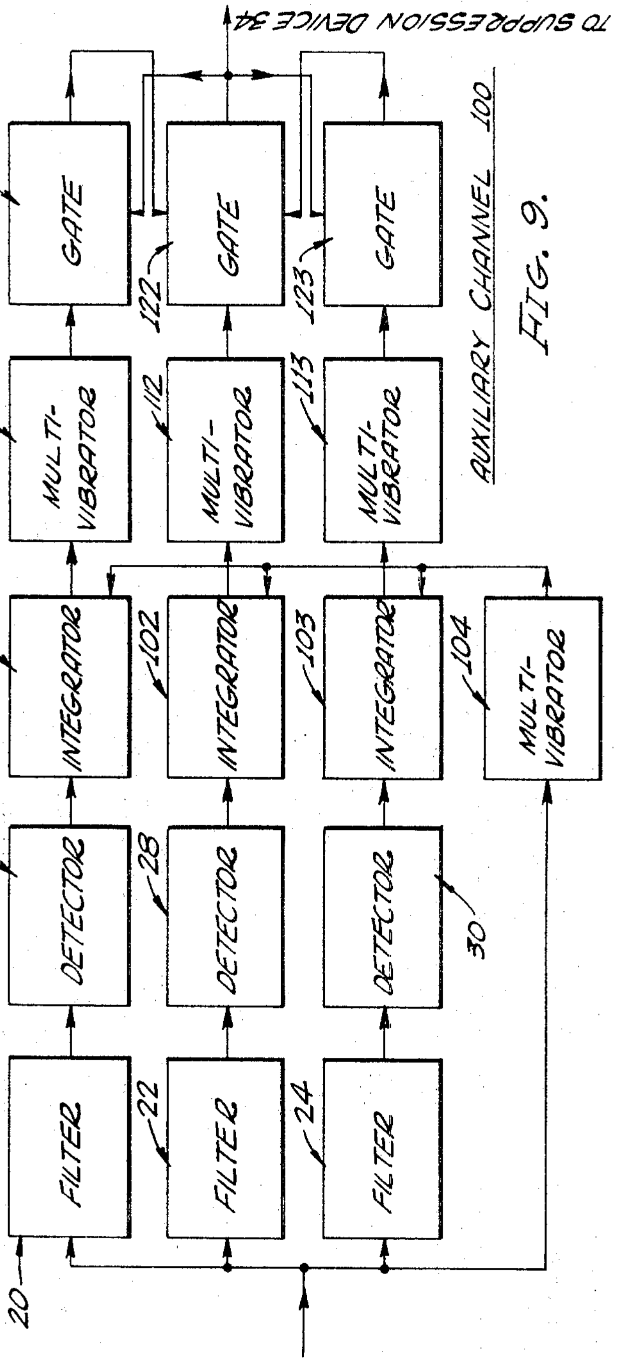
FIG. 9 is a diagrammatic view of an alternative embodiment of an auxiliary channel which may be employed with the embodiment of the invention shown in FIG. 1.

An alternative embodiment of the auxiliary channel shown in FIG. 1 is also shown in FIG. 9. This channel includes the first, second and third filters, 20, 22 and 24, respectively, the inputs of which are provided by limiter 19 which is also connected to a multivibrator 104. The outputs of filter networks 20, 22 and 24 are then impressed upon integrators 101, 102 and 104, respectively, which integrate the output of multivibrator 104 which is impressed thereon to produce an output trigger when the length of time the output gate of multivibrator 104 corresponds to the amplitude of the outputs of detectors 26, 28 and 30, which are connected from the outputs of filters 20, 22 and 24 respectively to integrators 101, 102 and 103. The trigger outputs of integrators 101, 102 and 103 are then respectively impressed upon multivibrators 111, 112 and 113 which produce gating signals accordingly. The output of multivibrator 112 is passed to suppression device 34 which is biased to suppress the output of delay device 36 in the instant gating arrangement although an analogous gating arrangement may be provided for a bias normally maintaining the receiver output directly through suppression device 34 to delay device 36. The outputs of multivibrators 111, 112 and 113 are then impressed upon gates 121, 122 and 123 respectively. The output of gate 122 is then impressed upon not only gates 121 and 123 but also suppression device 34. The outputs of gates 121 and 123 are then impressed upon gate 122 to prevent the output signal of multivibrator 112 from passing through gate 122 if the outputs of either multivibrator 111 or 113 is generated first, this indicating that an off-frequency signal has been received.

Thus, in the operation of the auxiliary channel shown in FIG. 9, if an on-frequency signal is received through antenna 10, the output of detector 28 will be the greatest and multivibrator 112 will generate a gate before multivibrators 111 and 113. This will then pass through normally opened gate 122 to block the output signals of gates 121 and 123, whereby gate 122 cannot be biased off. If an off-frequency signal is received, the output of one of the detectors 26 or 30 will be higher than that of the output of detector 28. In this case, one of the multivibrators 111 and 113 will be triggered to produce a gate which will be passed by either gate 122 or 123 to bias gate 122 off to prevent it from passing the output signal of multivibrator 122 to open normally biased suppression device 34.

Figure 10:
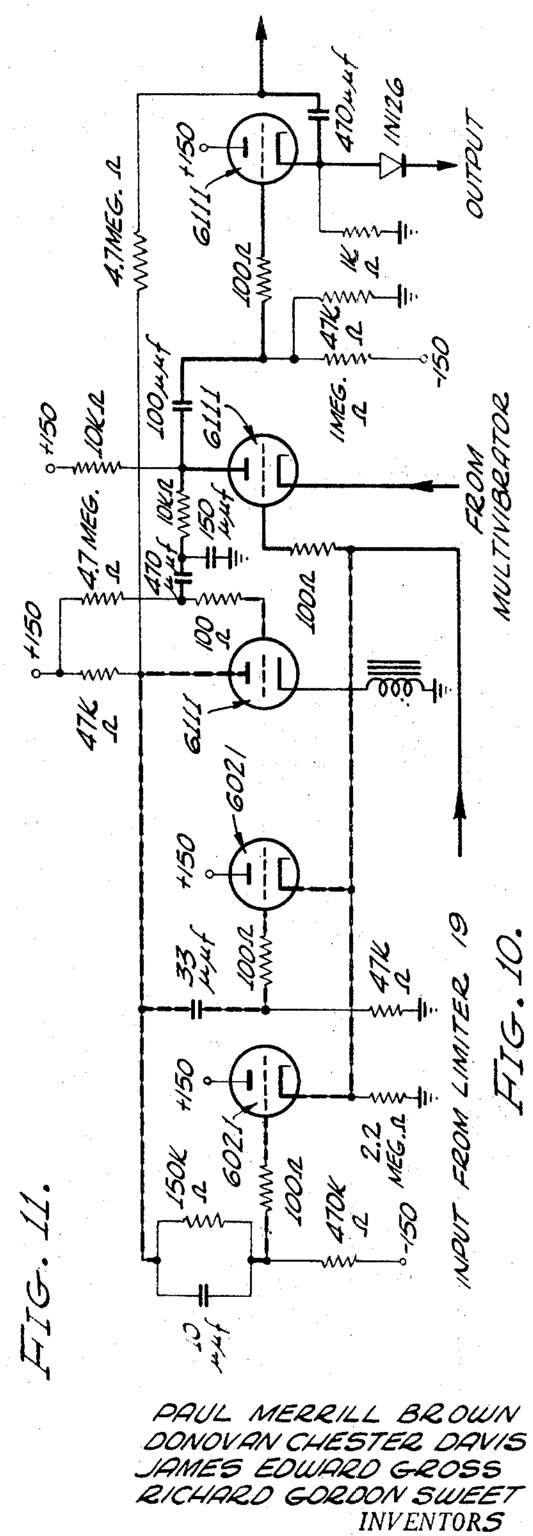
FIG. 10 is a schematic diagram of one of the components of the auxiliary channel shown in FIG. 9.

All the component parts shown in the diagram of FIG. 9 may be substantially conventional. Each of the integrators 101, 102 and 103 may be of identical construction. A detailed schematic diagram of one such integrator is shown in FIG. 10 including simply a regenerative amplifier.

Figure 11:
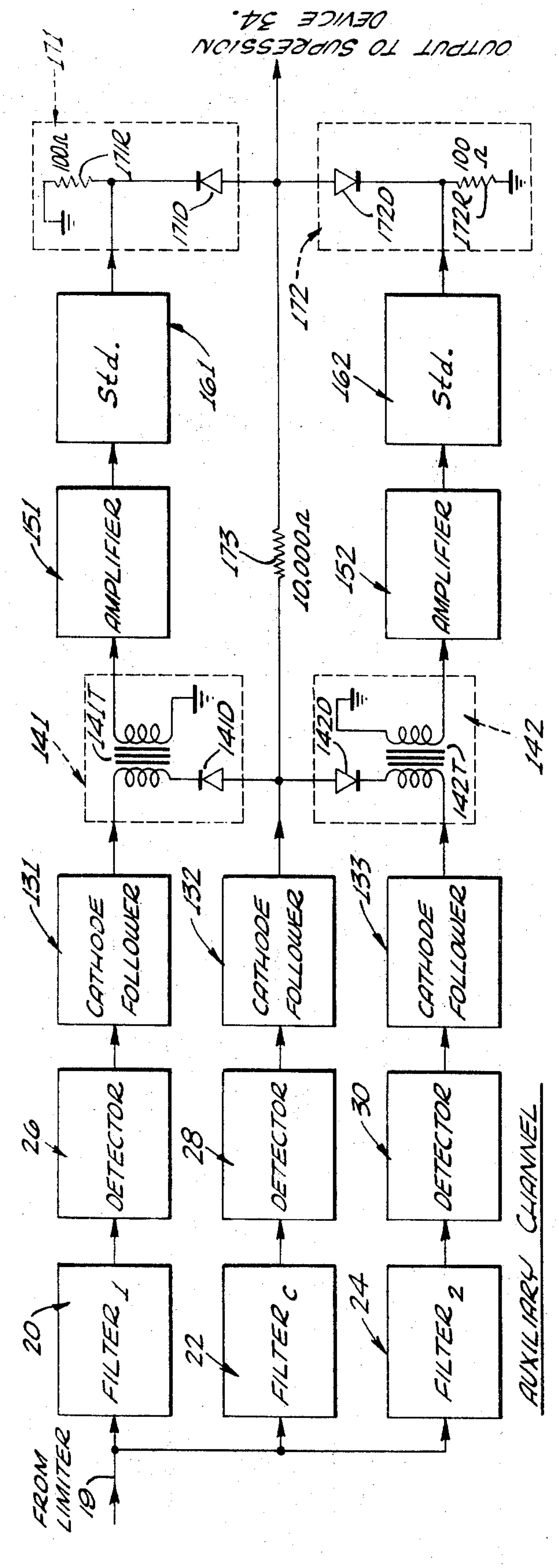
FIG. 11 is a schematic diagram of still another alternative auxiliary channel which may be employed with the embodiment of the invention shown in FIG. 1.

Still another alternative construction for the auxiliary channel of the embodiment of the invention as shown in FIG. 1 is shown in FIG. 11. Filter networks 20, 22 and 24 are there shown connected from limiter 19 and detectors 26, 28 and 30 are connected respectively from filter networks 20, 22 and 24. As isolation stages, three cathode followers 131, 132 and 133 are connected respectively from detectors 26, 28 and 30. Gating circuits 141 and 142 are provided to produce output pulses when and only when the output of cathode follower 132 exceeds the output of cathode followers 131 and 133, respectively. Amplifiers 150 and 152 then amplify the gates of 141 and 142 and standardizers 161 and 162 produce standardized gating signals to shunt the output of cathode follower 132 substantially to ground by gates 171 and 172 respectively except when gates at the outputs of standardizers 161 and 162 are generated. It is to be noted that gate 141 includes a diode 141D connected to a transformer 141T to produce an output signal therefrom when the output of cathode-follower 132 exceeds that of cathode follower 131. Similarly, a diode 142D is connected to a transformer 142T and gate 142 to provide an output signal when the output of cathode follower 132 exceeds that of cathode follower 133. Gate 171 is provided with diode 171D and a resistor 171R. Similarly, gate 172 is provided with a diode 172D and a resistor 172R.

In the operation of the auxiliary channel as shown in FIG. 11, when an off-frequency signal is received, the output of cathode follower 132 will exceed the outputs of both cathode followers 131 and 133. In this case, an output signal will be generated by both the gates 141 and 142 which will be respectively amplified by amplifiers 151 and 152. The outputs of amplifiers 151 and 152 are then impressed upon standardizers 161 and 162 to produce gates which are impressed upon the mutual junction of diodes 171D, 171R, and 172D, 172R, respectively. It is to be noted that a resistor 173 is connected from the output of cathode follower 132 to the anodes of diodes 171D and 172D. Thus, if gates are generated by standardizers 161 and 162, diodes 171D and 172D will be back biased and therefore will present an extremely high resistance both in comparison to the resistance of resistor 173 which may be 10,000 ohms and resistors 171R and 172R which may be 100 ohms. This means that the output of the auxiliary channel which will be impressed upon suppression device 34 biased normally to suppress the output signal delay device 36, will be positive to open the suppression device 34 when an on-frequency signal is received.

In the event that an off-frequency signal is received, the outputs of one of the cathode followers 131 of 133 will exceed that of cathode follower 132. In this case, one of the gating circuits 141 or 142 will not produce an output signal. Hence, one of the standardizers 161 of 162 will not impress a back biasing gate on one of the diodes 171D or 172D. In this case, the output side of resistor 173 will be maintained nearly at ground potential since the resistance of the resistors 171R and 172R is small in comparison to that of resistor 172. This means that the output signal of cathode follower 132 will be clamped substantially at ground potential and no substantial input signal will be impressed upon suppression device 34 to open it so that the output signal of delay device 36 will be passed as the receiver output.

Figures 12, 13:
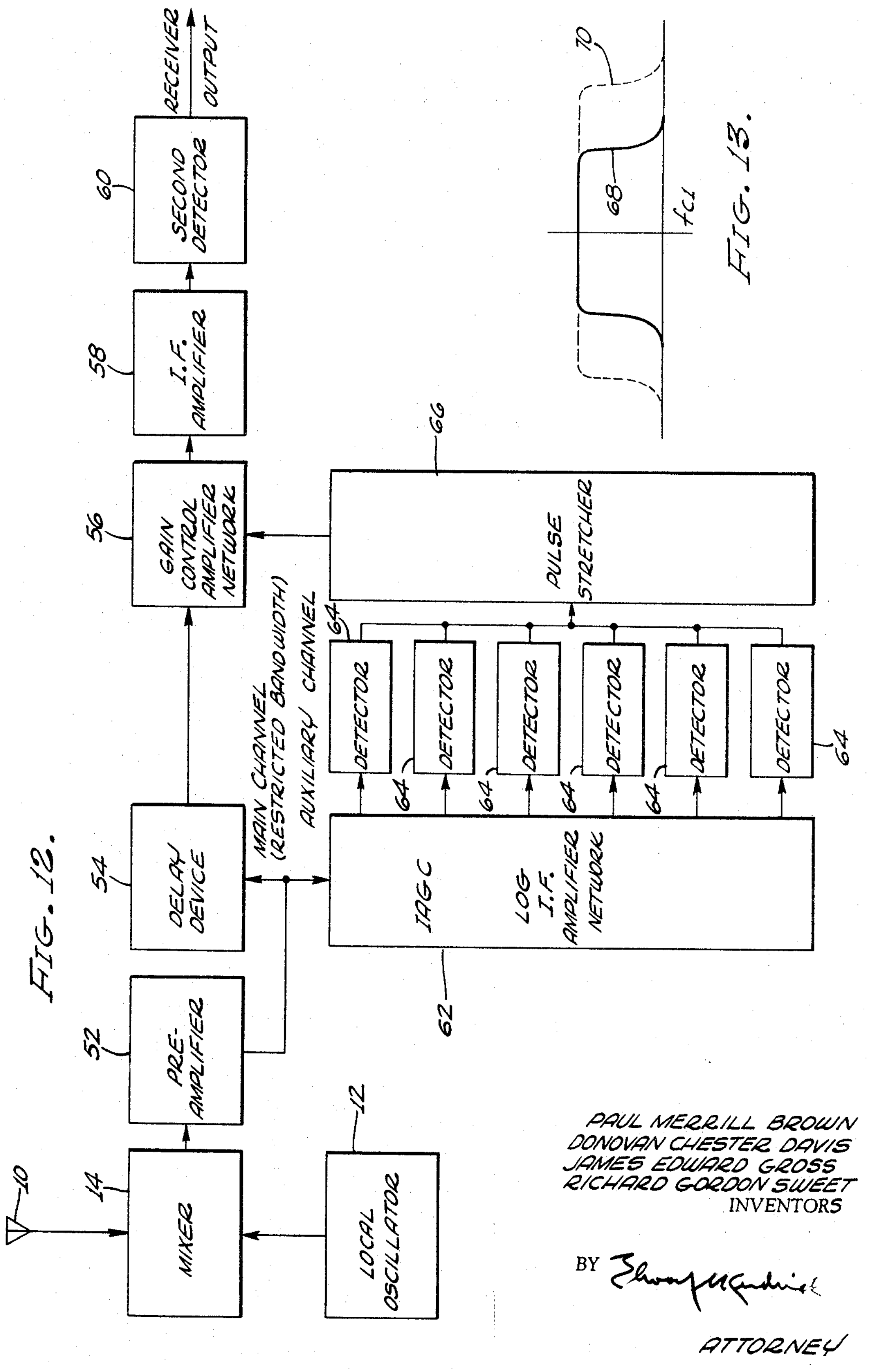
FIG. 12 is a diagrammatic view of still another embodiment of the invention.
FIG. 13 is a graph of the pass bands of devices in both a main and auxiliary pulse receiving channel shown in FIG. 12.

An alternative embodiment of the invention is shown in FIG. 12 where antenna 10, mixer 14 and local oscillator 12 are employed to impress an intermediate frequency signal on a preamplifier 52. The output of preamplifier 52 is impressed upon a delay device 54 which is employed with a gain control amplifier 56, an IF amplifier 58 and a second detector 60 in succeeding stages in a main receiving channel. An IAGC IF amplifier network 62 is shown connected to six detectors 64, the outputs of which are impressed upon a pulse detector 66 that operates gain control amplifier 56.

Amplifier network 62 may consist of a plurality of parallel connected amplifiers having different band widths, each of the amplifiers being connected to one of the detectors 64. The object in using the amplifier network 62 is to provide a composite amplifier having a band width greater than the band width of the main channel. The main channel band width may be restricted by the combination of a filter in the delay device 54 or in the restricted band width of gain control amplifier network 56.

Pulse stretch 66 simply provides means to produce a sufficiently constant and long control signal to reject off-frequency signals and to pass on-frequency signals. The band width of the main channel may be as illustrated at 68 in FIG. 13. The band width of the auxiliary channel may be as illustrated at 70. $f_{ct}$ may be the center frequency of each of the bands 68 and 70.

In the operation of the embodiment of the invention shown in FIG. 12 an off-frequency signal received through the antenna 10 mixed with the output of local oscillator 12 and mixer 24 and amplified by preamplifier 52 is impressed upon delay device 54 and amplifier network 62 simultaneously. IAGC amplifier amplifies the intermediate frequency signal, the output of which is amplified by pulse stretcher 66. When the off-frequency signal has a fundamental frequency outside the band indicated at 68 in FIG. 13, it will be obvious that the power distributed in the band 70 will be substantially greater than that contained in the main channel band 68. In this case, an inverse bias is impressed upon gain control amplifier 56 by pulse stretcher 66 to reject off-frequency signals. In this case, it is to be noted that regardless of which side, i.e. the lower or upper side of the band 68, the fundamental frequency of the off-frequency signal exists, the power distributed in the band 70 will be substantially greater than that distributed in the band 68. This means that for any off-frequency signal lower or higher than the band 68, gain control amplifier network 56 will be supplied with an inverse bias to suppress the output signal of delay device 54 or, in effect, an intermediate frequency signal corresponding to an off-frequency signal.

When an on-frequency signal is received, the power distributed in band 70 will be very little larger than the power distributed in the band 68. Hence, very little inverse bias will be impressed upon gain control amplifier network 56 and the intermediate frequency corresponding to the on-frequency signal at the output of delay device 54 will be passed. IF amplifier 58 simply amplifies the output of gain control amplifier network 56 and second detector 60 detects the output of IF amplifier 58.

It will be noted that a mixer such as the mixer 14 will most generally be employed with any of the embodiments of the invention, although in certain special cases this may not be necessary. In addition, for good serviceable operation, a delay device such as the delay device 36 shown in FIG. 1 of the delay device 54 shown in FIG. 12 is employed to delay the main channel signals, whereby instantaneous automatic gain control may be more effectively achieved as is the usual case. The use of preamplifiers or IF amplifiers before or after automatic gain control is achieved is not specially required and those shown in FIGS. 1 and 12 are only representative of preferred embodiments of the invention. The position of second detector 18 and second detector 60 shown in FIGS. 1 and 12, respectively, are preferred, but need not absolutely be maintained. It is to be noted that the second detector 18 is detected between IF amplifier 16 for both the auxiliary and main channels in FIG. 1 and connected in the main channel before the suppression device 34, whereas second detector 60 is connected after IF amplifier 58 and gain control amplifier network 56 in the main channel shown in FIG. 12.

Figure 14B:
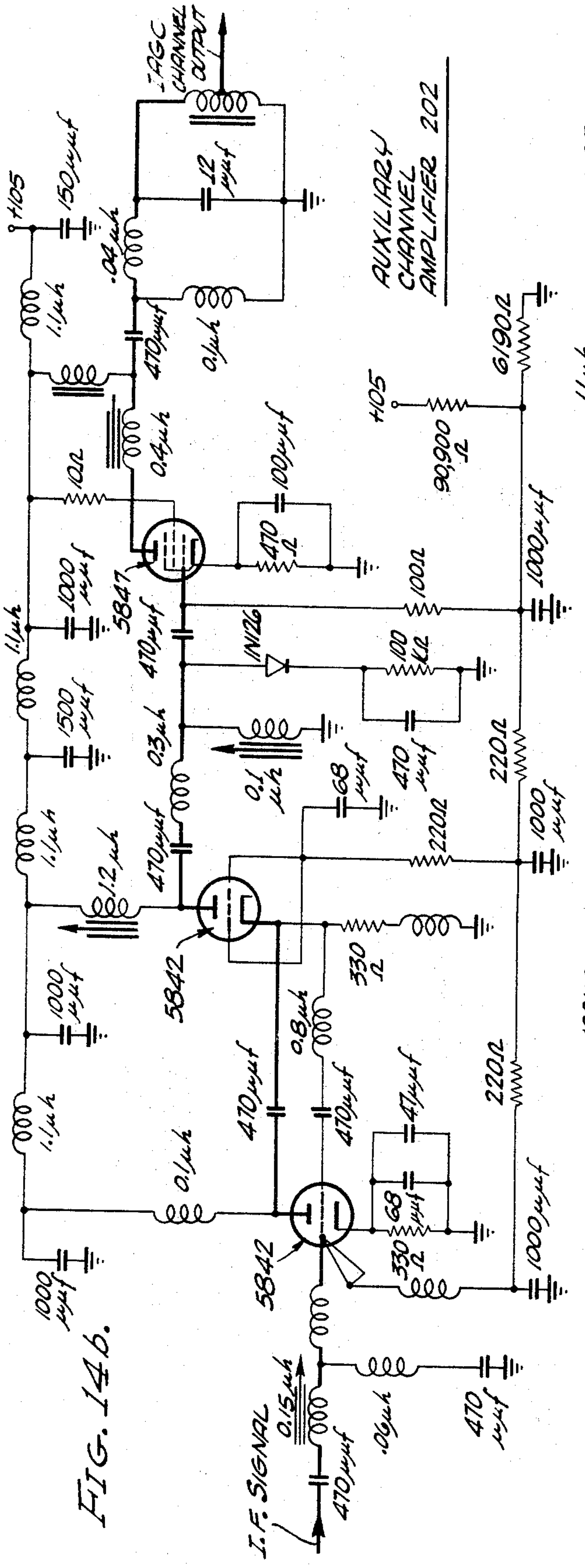
Figure 14A:
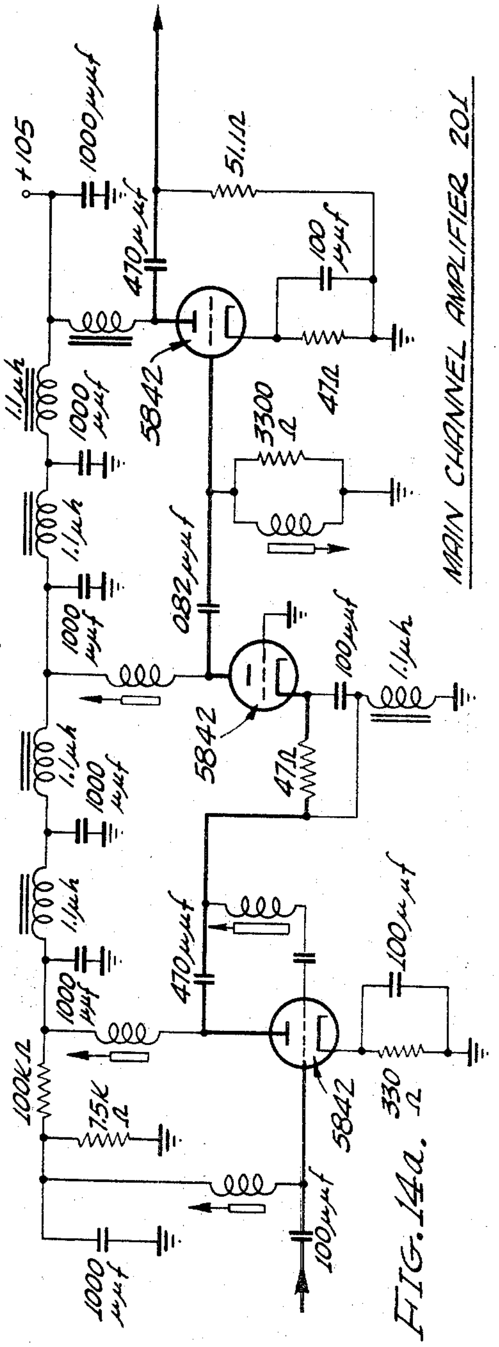

Preamplifier 52 may have a detailed construction as indicated in FIG. 14 where the inputs to each of the main and auxiliary channels is provided by separate main and auxiliary channel preamplifiers indicated at 201 and 202 respectively.

Figure 15A:
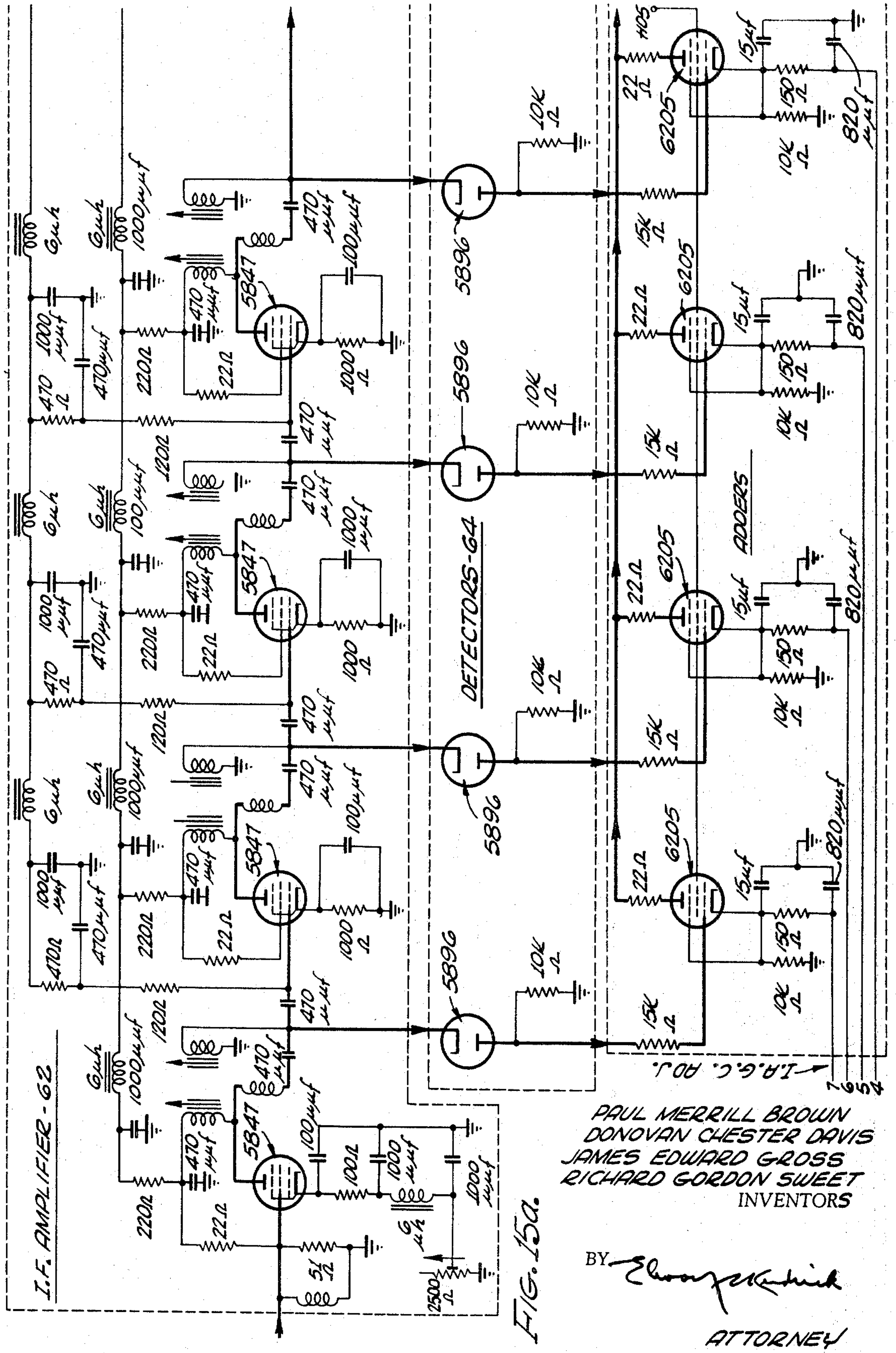
Figure 15B:
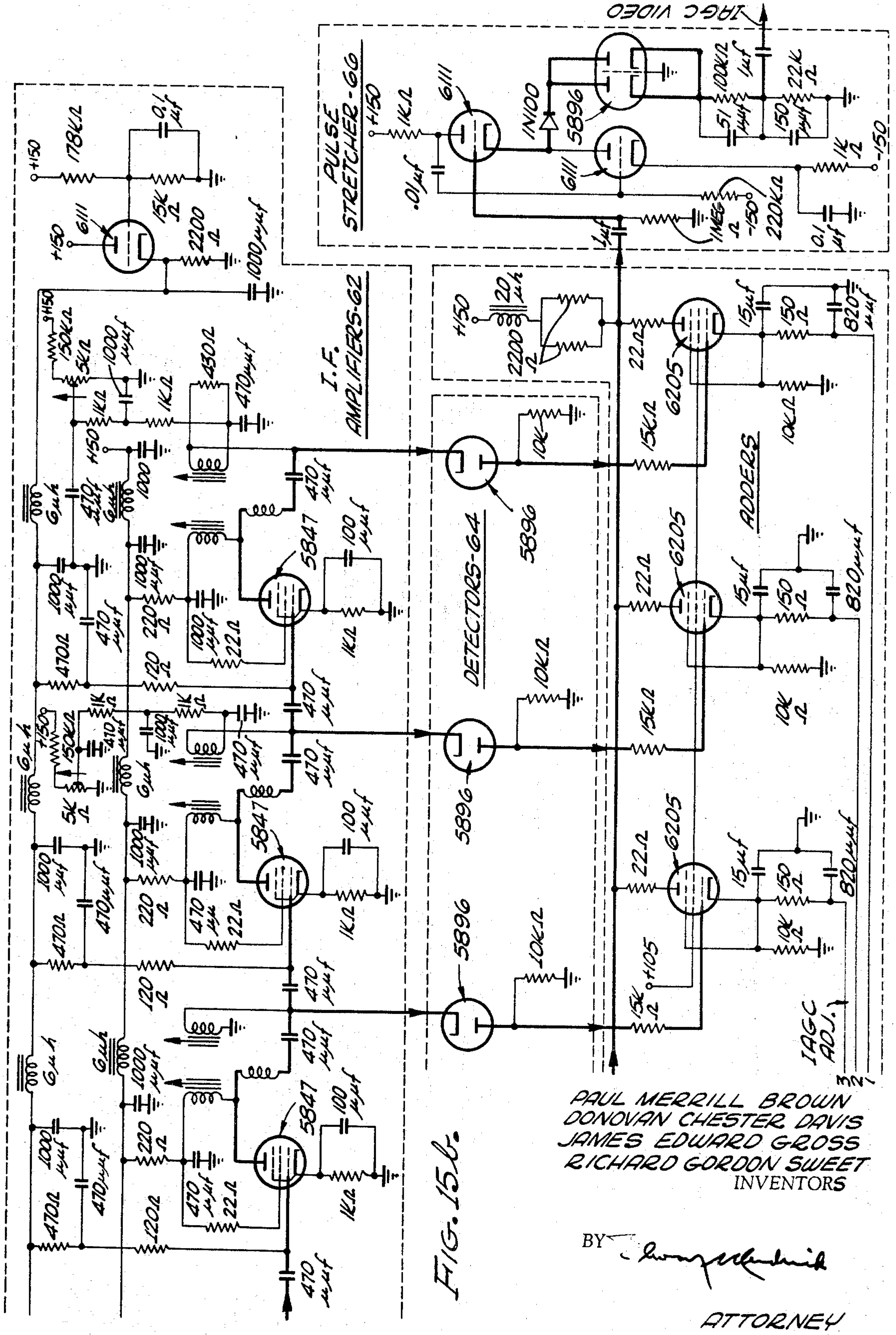
Figure 16:
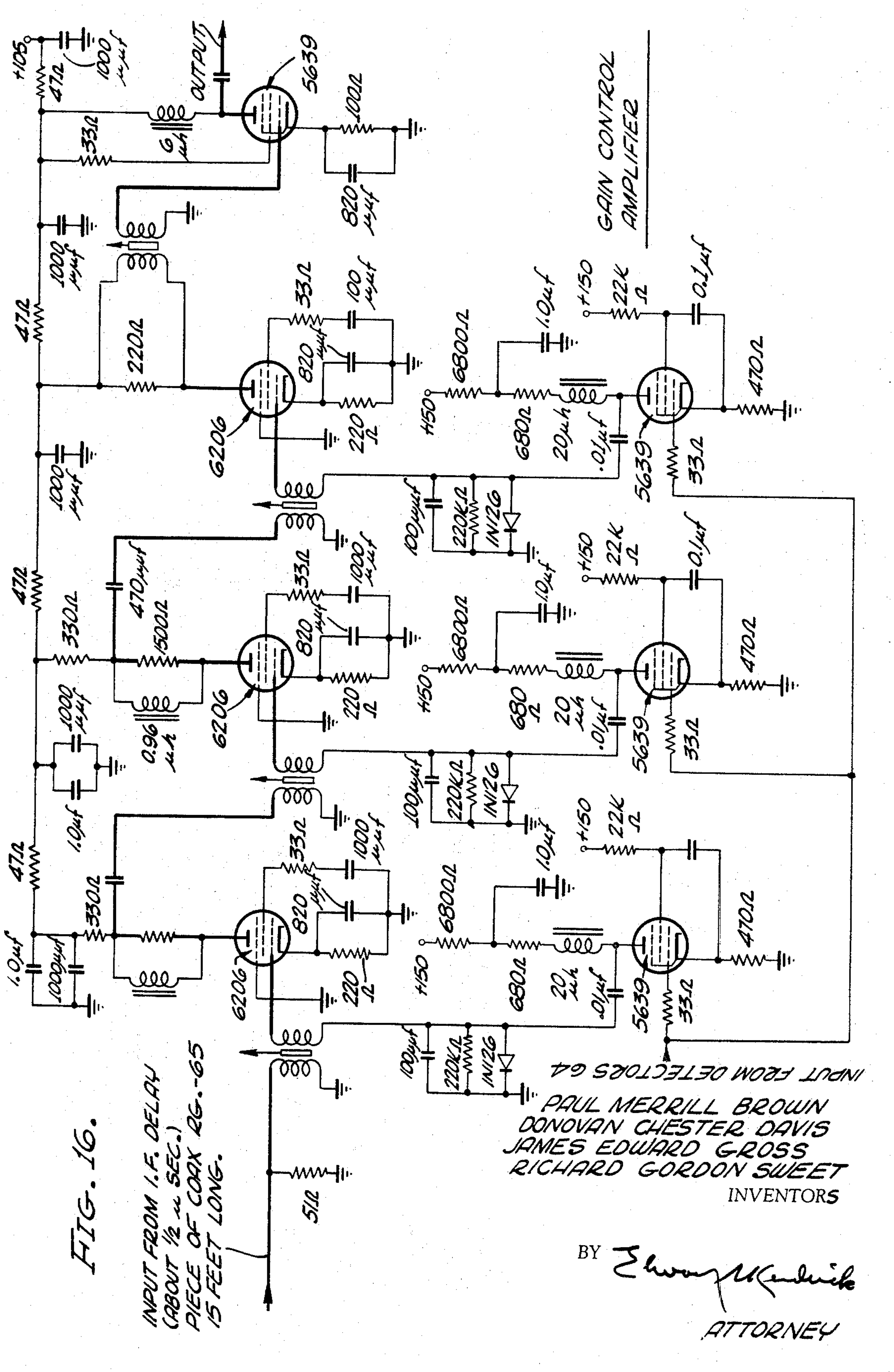

Detailed schematic diagrams of IAGC amplifier 62, detector 64 and pulse stretcher 66 are shown in FIG. 15. IAGC IF amplifier may be a logarithmetic type amplifier to match the gain control characteristic of gain control amplifier network 56. A schematic diagram of network 56 is shown in FIG. 16. The remainder of the components and all the detailed schematic diagrams shown and described hereinbefore may be of substantially conventional types. In all the detailed schematic diagrams, the numbers indicate resistor, capacitor and inductor values ohms, micromicrofarads and microhenrys respectively unless otherwise specified.

If some sort of instantaneous automatic gain control is provided before the main and auxiliary channels shown in FIG. 1, the second filter network 22 may be eliminated and replaced with a threshold device connected from each of the first and third filters 20 and 24 to provide a control signal when the output of these filters is above a predetermined minimum value. Of course, as before, only one of the filters 20 and 24 need be employed to reject off-frequency signals on the same side of the receiver pass band on which the pass band of the particular filter network is located. In this case the receiver will not be as selective as those in the preferred embodiment shown in FIGS. 1 and 5, however, it will certainly be operative.

Another embodiment of the invention might include embodiments substantially as shown in FIG. 1. However, the comparator need not take the form as that shown in FIG. 4, but may include means to add the outputs of the first and third filters 20 and 24 and means for comparing this sum with the output of second filter network 22. Rejection of all frequency signals may then be made on the sense of the comparison between the output of second filter network 22 and the sum of the outputs of first and third filter networks 20 and 24.

In still another modification of the embodiment of the invention shown in FIG. 1, the use of the second filter network 22 may be eliminated and the outputs of the first and third networks 20 and 24 may be subtracted. A threshold device may be also used in this modification to reject off-frequency signals when the difference between the outputs of first and third networks 20 and 24 exceed a certain minimum value.

The embodiments of the invention shown in FIGS. 1 and 4 are particularly preferred since they will generally provide the best selection of on-frequency signals from off-frequency signals.

Many other changes and modifications of the invention will, of course, suggest themselves to those skilled in the art, and it is to be understood that the scope of the invention is not to be limited by the specific embodiments shown and described above, but is only limited as defined in the accompanying claims.

What is claimed is:

1. In a system having a main channel for receiving pulsed alternating signals having fundamental frequencies laying in a predetermined pass band of interest, and an auxiliary channel for controlling the output of said main channel, the combination comprising: first, second and third filter networks in said auxiliary channel, said second filter network having a second pass band coextensive with said predetermined pass band, said first filter network having a first pass band below said second pass band, said third filter network having a third pass band above said second pass band, the width of said first pass band being such that an output signal greater than that of said second filter network is passed by said first filter network when signals having fundamental frequencies below said second pass band are received by said system and an output signal less than that of said second filter network is passed by said first filter network when signals having fundamental frequencies within said second pass band are received by said system, the width of said third pass band similarly being such that an output signal greater than that of said second filter network is passed by said third filter network when signals having fundamental frequencies above said second pass band are received by said system and an output signal less than that of said second filter network is passed by said third filter network when signals having frequencies within said second pass band are received by said system, first means responsive to the output signals of said filter networks for producing a control signal when the output of said second filter network is different from either of those of said first and third filter networks, and second means responsive to said control signal for suppressing the output of said second filter network.

2. The invention as defined in claim 1, wherein said means for producing a control signal includes first, second and third peak detectors connected respectively from said first, second and third filter networks.

3. In a radiant energy receiver, the combination comprising: a main channel having a pass band to receive incoming signals; a first band pass filter network also connected to receive incoming signals and having a pass band at the center of said main channel pass band; a second band pass filter network connected to receive incoming signals and having a pass band adjacent that of said first filter network; subtraction means responsive to the output signals of said filter networks for producing a control signal having a first magnitude when the output signal of said first pass band filter network is greater than that of said second band pass filter network and having a second and different magnitude when said second band pass filter network has an output signal magnitude greater than that of said first band pass filter network; and means responsive to said control signal for automatically passing the output of said main channel when said control signal is of said first magnitude and for suppressing the output of said main channel when said control signal is of said second magnitude.

4. In a radiant energy receiver, the combination comprising: a main channel having a pass band to receive incoming signals; a first band pass filter network also connected to receive incoming signals and having a pass band at the center of said main channel pass band; a second band pass filter network connected to receive incoming signals and having a pass band adjacent that of said first filter network; subtraction means responsive to the output signals of said filter networks for producing a control signal having a first magnitude when the output signal of said first pass band filter network is greater than that of said second band pass filter network, said control signal having a second and different magnitude when said second band pass filter network has an output signal magnitude greater than that of said first band pass filter network; and means responsive to said control signal for automatically passing the output of said main channel when said control signal is of said first magnitude and for reducing the output signal magnitude of said main channel to zero when said control signal is of said second magnitude.

5. In a radiant energy receiver, the combination comprising: a main channel having a band width sufficiently large to receive radar pulses; a first band pass filter network also connected to receive said radar pulses and having a pass band at the center of said main channel pass band; a second band pass filter network connected to receive said radar pulses having a pass band adjacent that of said first filter network; subtraction means responsive to the output signals of said filter networks for producing a control signal having a first magnitude when the output signal of said first pass band filter network is greater than that of said second band pass filter network, said control signal having a second and different magnitude when said second band pass filter network has an output signal magnitude greater than that of said first band pass filter network; and means responsive to said control signal for automatically passing the output of said main channel when said control signal is of said first magnitude and for reducing the output signal magnitude of said main channel to zero when said control signal is of said magnitude.

6. In a radiant energy receiver, the combination comprising: a main channel having a band width sufficiently large to receive radar pulses; a first band pass filter network also connected to receive said radar pulses and having a pass band at the center of said main channel pass band; a second band pass filter network connected to receive said radar pulses having a pass band adjacent that of said first filter network; subtraction means responsive to the output signals of said filter networks for producing a control signal having a first magnitude when the output signal of said first pass band filter network is greater than that of said second band pass filter network and having a second and different magnitude when said second band pass filter network has an output signal magnitude greater than that of said first band pass filter network; and instantaneous automatic gain control means responsive to said control signal for automatically passing the output of said main channel when said control signal is of said first magnitude and for reducing the output signal magnitude of said main channel to zero when said control signal is of said second magnitude.

7. In a radiant energy receiver, the combination comprising: a main channel having a pass band to receive incoming signals; a first band pass filter network also connected to receive said incoming signals and having a pass band at the center of said main channel pass band; a second band pass filter network connected to receive incoming signals and having a pass band adjacent that of said first filter network below it; a third band pass filter network connected to receive incoming signals and having a pass band adjacent that of said first filter network above it; subtraction means responsive to the output signals of said filter networks for producing a control signal having a first magnitude when at least one of the output signals of said second and third filter networks is greater than that of said first filter network and having a second and different magnitude when said first filter network has an output signal magnitude greater than both of those of said second and third filter networks; and means responsive to said control signal for automatically passing the output of said main channel when said control signal is of said second magnitude and for automatically supressing the output of said main channel when said control signal is of said first magnitude.

8. In a radiant energy receiver, the combination comprising: a main channel having a pass band to receive radar pulses; a first band pass filter network also connected to receive said radar pulses and having a pass band at the center of said main channel pass band; a second band pass filter network connected to receive said radar pulses and having a pass band adjacent that of said first filter network below it; a third band pass filter network connected to receive said radar pulses and having a pass band adjacent that of said first filter network above it; subtraction means responsive to the output signals of said filter networks for producing a control signal having a first magnitude when at least one of the output signals of said second and third filter networks is greater than that of said first filter network and having a second and different magnitude when said first filter network has an output signal magnitude greater than both of those said second and third filter networks; and means responsive to said control signal for automatically passing the output of said main channel when said control signal is of said second magnitude and for automatically suppressing the output of said main channel when said control signal is of said first magnitude.

* * * * *